US012777390B2

(12) United States Patent
Gomez-Hidalgo Perez et al.

(10) Patent No.: US 12,777,390 B2
(45) Date of Patent: Oct. 27, 2026

(54) TECHNIQUE ENABLING SELECTION OF CORE DOMAIN QOS POLICIES IN A CONTENT PROVIDER DOMAIN

(71) Applicant: Telefonaktiebolaget LM Ericsson (publ), Stockholm (SE)

(72) Inventors: Victor Gomez-Hidalgo Perez, Torrijos Toledo (ES); Carlota Villasante Marcos, Madrid (ES); Miguel Angel Muñoz De La Torre Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 271 days.

(21) Appl. No.: 18/729,625

(22) PCT Filed: Mar. 9, 2022

(86) PCT No.: PCT/EP2022/056044

§ 371 (c)(1),
(2) Date: Jul. 17, 2024

(87) PCT Pub. No.: WO2023/138796

PCT Pub. Date: Jul. 27, 2023

(65) Prior Publication Data

US 2025/0097806 A1 Mar. 20, 2025

(30) Foreign Application Priority Data

Jan. 21, 2022 (EP) .................................... 22382041

(51) Int. Cl.
*H04W 36/30* (2009.01)
*H04L 47/127* (2022.01)
*H04L 47/20* (2022.01)

(52) U.S. Cl.
CPC ........... *H04W 36/30* (2013.01); *H04L 47/127* (2013.01); *H04L 47/20* (2013.01)

(58) Field of Classification Search
CPC ....... H04W 36/30; H04L 47/127; H04L 47/20
See application file for complete search history.

(56) References Cited

U.S. PATENT DOCUMENTS

2015/0358901 A1* 12/2015 Kahn ...................... H04W 8/18 455/434
2021/0243641 A1 8/2021 Gangakhedkar et al.

(Continued)

FOREIGN PATENT DOCUMENTS

EP 3913963 A1 11/2021

OTHER PUBLICATIONS

International Search Report and Written Opinion dated Oct. 12, 2022 for International Application No. PCT/EP2022/056044 filed Mar. 9, 2022, consisting of 13 pages.

(Continued)

*Primary Examiner* — Duc C Ho
(74) *Attorney, Agent, or Firm* — Weisberg I.P. Law, P.A.

(57) ABSTRACT

A technique enabling selection of Quality of Service, QoS, policies of a core domain of a mobile communication network is described. A method performed by a first network node, NN, configured as at least a part of the core domain includes providing, based on at least one network condition, a second NN in a content provider domain with information enabling a selection of at least one of one or more policies of the core domain that affect a QoS provided by the core domain for content provided by the content provider domain. A corresponding method performed by the second NN is also provided.

20 Claims, 7 Drawing Sheets

(56) References Cited

U.S. PATENT DOCUMENTS

| | | | | |
|---|---|---|---|---|
| 2023/0403731 | A1* | 12/2023 | Sabella | H04L 41/0895 |
| 2024/0064683 | A1* | 2/2024 | Salkintzis | H04W 60/00 |

OTHER PUBLICATIONS

3GPP TS 29.122 V17.0.0; 3rd Generation Partnership Project; Technical Specification Group Core Network and Terminals; T8 reference point for Northbound APIs; (Release 17); Dec. 2020, consisting of 370 pages.

3GPP TR 23.708 V2.0.0; 3rd Generation Partnership Project; Technical Specification Group Services and System Aspects; Architecture Enhancements for Service Capability Exposure (Release 13); Jun. 2015, consisting of 31 pages.

3GPP TS 23.502 V17.3.0; 3rd Generation Partnership Project; Technical Specification Group Services and System Aspects; Procedures for the 5G System (5GS); Stage 2 (Release 17); Dec. 2021, consisting of 727pages.

SA WG2 Meeting #127 S2-183738 (revision of S2-181951); SA WG2 Temporary Document; Title: Solution for KI#3: Enhancements for QoS Monitoring and Control; Agenda Item: 6.6; Source: Huawei, HiSilicon; Work Item/Release: FS_eV2XARC; Document for: Approval; Date and Location: Apr. 16-20, 2018, Sanya, CN; consisting of 3 pages.

3GPP TS 29.522 V17.2.0; 3rd Generation Partnership Project; Technical Specification Group Core Network and Terminals; 5G System; Network Exposure Function Northbound APIs; Stage 3 (Release 17); Jun. 2021, consisting of 257 pages.

* cited by examiner

TECHNIQUE ENABLING SELECTION OF CORE DOMAIN QOS POLICIES IN A CONTENT PROVIDER DOMAIN

CROSS-REFERENCE TO RELATED APPLICATIONS

This application is a Submission Under 35 U.S.C. § 371 for U.S. National Stage Patent Application of International Application No.: PCT/EP2022/056044, filed Mar. 9, 2022 entitled "TECHNIQUE ENABLING SELECTION OF CORE DOMAIN QOS POLICIES IN A CONTENT PROVIDER DOMAIN," which claims priority to European Application No.: EP22382041.6, filed Jan. 21, 2022, entitled "TECHNIQUE ENABLING SELECTION OF CORE DOMAIN QOS POLICIES IN A CONTENT PROVIDER DOMAIN," the entireties of both of which are incorporated herein by reference.

TECHNICAL FIELD

The present disclosure generally relates to Quality of Service (QoS) provided by a communication network core domain for content provided by a content provider domain. In more detail, the disclosure relates to a method performed by a first network node, configured as at least a part of the core domain, and to a method performed by a second network node in the content provider domain. The disclosure also relates to the corresponding network nodes, a system comprising both network nodes, to a computer program and to a computer-readable medium.

BACKGROUND

Mobile (e.g., cellular) communication networks comprise a core domain (CD) that may serve a content provider domain (CPD) to allow content to flow between the CPD and a traffic recipient, such as a user equipment (UE), via the communication network. The CD may manage network resources of the communication network to ensure a certain QoS for content provided by the CPD.

The CD may manage the network resources depending on a Service Level Agreement (SLA) between the CD and the CPD. The CPD may request a certain QoS from the CD, based on the SLA. This approach relies on the previously established (e.g., static) SLA, so the CD is able to manage the network resources based on the Qos, which can be guaranteed.

In some variants, a CPD may be allowed to request a QoS target irrespective of an SLA. In this and similar cases, the CD may not be able to fulfil the requested Qos target, and may reject the corresponding request from the CPD.

In some scenarios, the CPD needs to implement its own logic about what flows of content to enhance in QoS, and provide an identification of these flows of content to the CD. There is no common and integrated solution of such a flow identification. All identified flows may need to be indicated from the CPD to the CD, potentially resulting in much signaling traffic between the CPD and the CD. There may be a delay between the flow identification by CPD and the action taken on the identified flow by the CD.

A Quality of Experience (QoE) is typically the decisive parameter from the perspective of a content consumer, such as a UE. QoE and QoS generally have a non-linear relationship, which may not be known to the CD but known to or determined by the CPD. On the other hand, the CPD may not be aware of the network conditions, which may change over time.

A content provider may not be interested in having a guaranteed premium QoS for all content traffic all the time. Moreover, the content provider may not be interested in having such a guaranteed premium QoS for all served users. As such, it may be desirable to support a greater flexibility in regard to QoS control.

SUMMARY

There is a need for a technique that solves one or more of the above or other problems.

According to a first aspect, a method performed by a first network node, NN, configured as at least a part of a core domain of a mobile communication network, is provided. The method comprises providing, based on at least one network condition, a second NN in a content provider domain, with information enabling a selection of at least one of one or more policies of the core domain that affect a QoS provided by the core domain for content provided by the content provider domain.

The at least one network condition may be a network condition of the mobile communication network. The at least one network condition may be indicative of the QoS. The at least one network condition may be indicative of a (e.g., detected or predicted) usage of network resources of the mobile communication network.

The QoS may be specific for network traffic associated with both the core domain and the content provider domain (e.g., flowing from one of these domains to the other). Alternatively, or in addition, at least one of the following conditions may be fulfilled:

(i) the QoS may be specific for a flow of network traffic associated with a user equipment;

(ii) the QoS may be specific for a flow of network traffic (e.g., content) associated with a user or subscriber of an application;

(iii) the QoS may be specific for a user or subscriber of an application;

(iv) the QoS may be specific for an application;

(v) the QoS may be specific for a traffic profile provided by the content provider domain. The application may be an application running on a (e.g., the) user equipment. The application may be running at least partly in the content provider domain. The application may be associated with (e.g., may receive or use) content provided by the CPD.

The second NN may be configured to communicate with the first NN. The second NN may be configured to provide content to a user or user equipment, via the mobile communication network. The second NN may be configured as an Application Function (AF) or an Application Server (AS).

The information may be provided by transmitting or exposing the information via an Application Programming Interface (API).

The first NN may be configured as at least one network function of the core domain of the mobile communication network. The part of the core domain of the mobile communication network may comprise a Network Exposure Function (NEF) or a Service Capabilities Exposure Function (SCEF). The first NN may be configured as at least the NEF or as at least the SCEF. In addition, the first NN may be configured as one or more further network functions (NFs) of the core domain of the mobile communication network.

The information may be provided, based on the at least one network condition, in case the at least one network condition fulfils a predetermined criterion. The information may be provided responsive to the at least one network condition fulfilling the predetermined criterion. The predetermined criterion may be indicative of a network condition change event. The predetermined criterion may be indicative of a QoS falling below a predetermined QoS level. The predetermined criterion may be indicative of a network congestion.

The information may be based on the at least one network condition. The information may be indicative of the at least one network condition or determined based on the at least one network condition. The information may comprise at least one parameter chosen from:

(i) an identifier of a network congestion event;
(ii) a (e.g., detected or predicted) value representative of a network congestion; and
(iii) an indication that a selection of the at least one of the one or more policies is allowed.

The information may comprise an indication of the (e.g., selectable) one or more policies of the core domain of the mobile communication network for selection in the content provider domain. The indicated one or more policies may have been determined (e.g., in the core domain) based on at least one process chosen from (i) congestion estimation or prediction;
(ii) prediction of user movement;
(iii) analysis of available network resources; and
(iv) analysis of a possible redistribution of network resources among users.

The one or more policies may comprise at least one option chosen from (i) a network slice configuration;
(ii) a guaranteed level of a QoS;
(iii) one or more traffic handling rules;
(iv) a configuration of reserved resources on an edge of the mobile communication network; and
(v) a transmission type.

The method may comprise transmitting, to the second NN, the at least one parameter in a first message. The first message may be sent in response to receiving a first request from the second NN. The method may further comprise transmitting, to the second NN, the indication of the one or more policies in a second message separate from the first message. The second message may be sent in response to receiving a second request from the second NN.

The method may comprise receiving, from the second NN, a selection message indicating a selection of the at least one of the one or more policies. The method may comprise triggering enforcement of the selected at least one of the one or more policies by the core domain of the mobile communication network.

According to a second aspect, a method performed by a second NN in a content provider domain is provided. The method comprises obtaining, from a first NN configured as at least a part of a core domain of a mobile communication network, based on at least one network condition, information enabling selection of at least one of one or more policies of the core domain that affect a QoS provided by the core domain for content provided by the content provider domain.

The at least one network condition may be a network condition of the mobile communication network. The at least one network condition may be indicative of the QoS. The at least one network condition may be indicative of a (e.g., detected or predicted) usage of network resources of the mobile communication network.

The QoS may be specific for network traffic associated with both the core domain and the content provider domain. Alternatively, or in addition, at least one of the following conditions may be fulfilled:

(i) the QoS may be specific for a flow of network traffic associated with a user equipment;
(ii) the QoS may be specific for a flow of network traffic (e.g., content) associated with a user or subscriber of an application;
(iii) the QoS may be specific for a user or subscriber of an application;
(iv) the QoS may be specific for an application;
(v) the QoS may be specific for a traffic profile provided by the content provider domain.

The application may be an application running on a (e.g., the) user equipment. The application may be running at least partly in the content provider domain. The application may be associated with (e.g., may receive or use) content provided by the CPD.

The second NN may be configured to communicate with the first NN. The second NN may be configured to provide content to a user or user equipment, via the mobile communication network. The second NN may be configured as an AF or an AS.

The information may be obtained by receiving or discovering the information via an API.

The first NN may be configured as at least one network function of the core domain of the mobile communication network. The part of the core domain of the mobile communication network may comprise a Network Exposure Function, NEF, or a Service Capabilities Exposure Function, SCEF. The first NN may be configured as at least the NEF or as at least the SCEF. In addition, the first NN may be configured as one or more further network functions of the core domain of the mobile communication network.

The information may be obtained, based on the at least one network condition, in case the at least one network condition fulfils a predetermined criterion. The information may be obtained responsive to the at least one network condition fulfilling the predetermined criterion. The predetermined criterion may be indicative of a network condition change event. The predetermined criterion may be indicative of a QoS falling below a predetermined QoS level. The predetermined criterion may be indicative of a network congestion.

The information may be based on the at least one network condition. The information may be indicative of the at least one network condition or determined based on the at least one network condition. The information may comprise at least one parameter chosen from:

(i) an identifier of a network congestion event;
(ii) a (e.g., detected or predicted) value representative of a network congestion; and
(iii) an indication that a selection of the at least one of the one or more policies is allowed.

The information may comprise an indication of the (e.g., selectable) one or more policies of the core domain of the mobile communication network for selection in the content provider domain. The indicated one or more policies may have been determined (e.g., in the core domain) based on at least one process chosen from (i) congestion estimation or prediction;
(ii) prediction of user movement;
(iii) analysis of available network resources; and (iv) analysis of a possible redistribution of network resources among users.

The one or more policies may comprise at least one option chosen from (i) a network slice configuration;
(ii) a guaranteed level of a QoS;
(iii) one or more traffic handling rules;
(iv) a configuration of reserved resources on an edge of the mobile communication network; and
(v) a transmission type.

The method may comprise receiving, from the first NN, the at least one parameter in a first message. The first message may be received in response to transmitting, to the first NN, a first request. The method may comprise receiving, from the first NN, the indication of the one or more policies in a second message separate from the first message. The second message may be received in response to transmitting, to the first NN, a second request.

The method may comprise selecting the at least one of the one or more policies. The method may comprise transmitting, to the first NN, a selection message indicating the selected at least one of the one or more policies. The method may comprise triggering enforcement of the selected at least one of the one or more policies by transmitting the selection message to the first NN.

According to a third aspect, a first NN configured as at least a part of a core domain of a mobile communication network is provided. The first NN is configured to provide, based on at least one network condition, a second NN in a content provider domain with information enabling a selection of at least one of one or more policies of the core domain that affect a QoS provided by the core domain for content provided by the content provider domain. The first NN may be configured to perform the method according to the first aspect.

According to a fourth aspect, a second NN in a content provider domain is provided. The second NN is configured to obtain, from a first NN configured as at least a part of a core domain of a mobile communication network, based on at least one network condition, information enabling selection of at least one of one or more policies of the core domain that affect a QoS provided by the core domain for content provided by the content provider domain. The second NN may be configured to perform the method according to the second aspect.

According to a fifth aspect, a system is provided. The system comprises the first network node according to the third aspect and the second network node according to the fourth aspect. The system may further comprise a user equipment. The system may further comprise a third network node (e.g., a base station) of an access network domain of the mobile communication network.

According to a sixth aspect, a computer program is provided. The computer program comprises instructions which, when the program is executed by at least one processor, cause the at least one processor to carry out the method according to the first aspect or according to the second aspect.

According to a seventh aspect, a computer-readable medium is provided. The computer-readable medium comprises instructions which, when executed by at least one processor, cause the at least one processor to carry out the method according to the first aspect or according to the second aspect.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
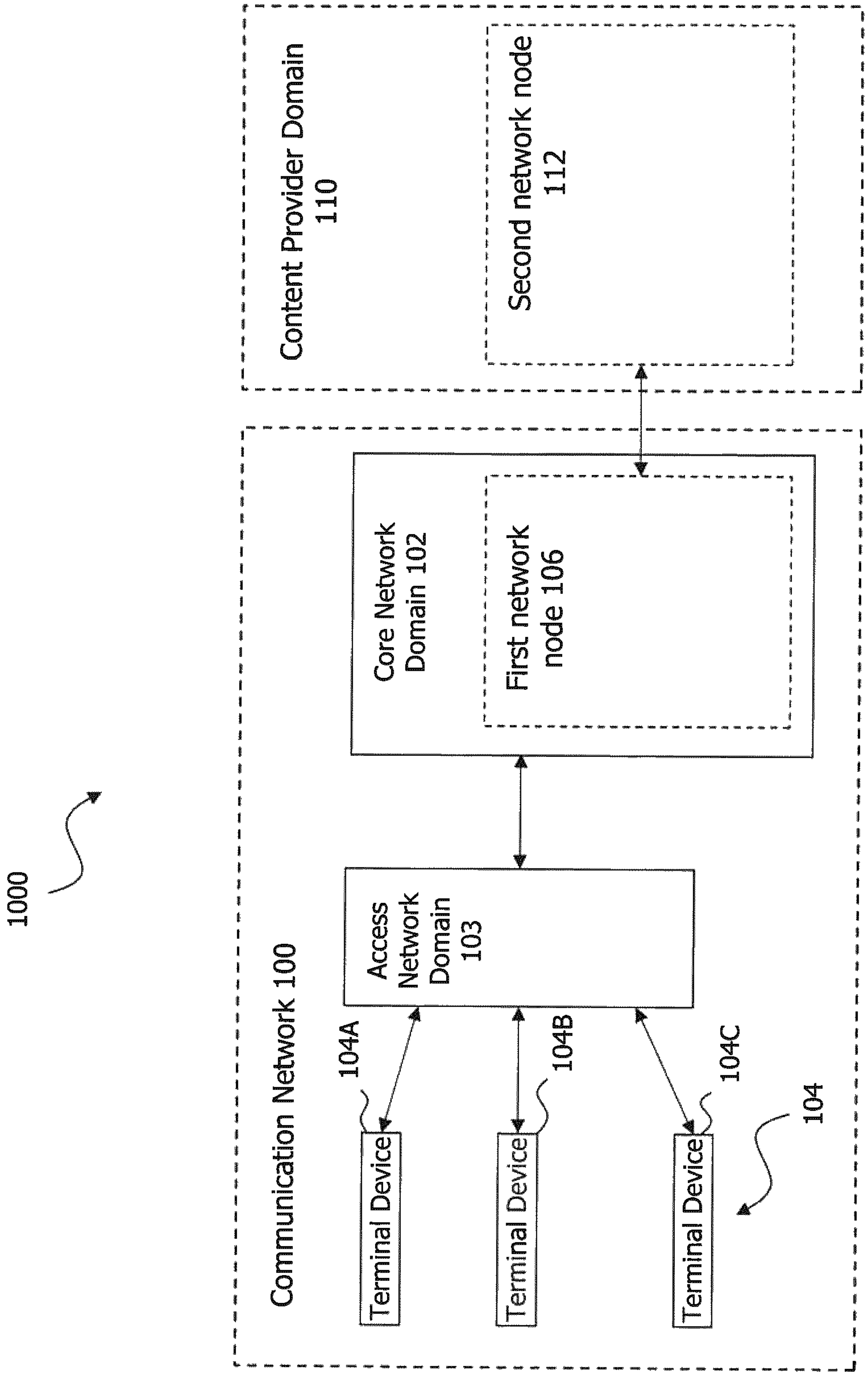
FIG. 1 is a diagram illustrating a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on an exemplary core network configuration in accordance with 5G specifications, the present disclosure is not limited in this regard. The present disclosure could also be implemented in other cellular or non-cellular wireless communication networks having a core network domain, such as those complying with 4G specifications. In this case, for example, the "application function" (AF) as presented herein may be replaced by a "service capability server" (SCS) or by an "application server" (AS), the "network exposure function" (NEF) as presented herein may be replaced by a "service capability exposure function" (SCEF), the "policy control function" (PCF) as presented herein may be replaced by a "policy control and charging rules function" (PCRF) and the "unified data repository" (UDR) as presented herein may be replaced by a "subscriber profile repository" (SPR).

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a network system 1000 in which the present disclosure can be implemented. As shown in FIG. 1, the network system 1000 comprises a communication network 100 operated by a network operator. The communication network 100 may be a mobile (e.g., a cellular) communication network.

As shown in FIG. 1, the communication network 100 comprises a core network domain, also referred to as core domain (CD) 102, and an access network domain (AND) 103. In some realizations, each of these domains comprises a user plane for transporting data traffic and a control plane for transporting control signaling.

The communication network 100 comprises a first network node (NN) 106 configured as at least a part of the CD 102. The first NN 106 may be configured to communicate with a content provider domain (CPD) 110 of the network system 1000. The CPD 110 may be operated by a content provider (sometimes also called service provider), whereas the CD 102 may be operated by a mobile network operator (MNO). A second network node 112 in the content provider domain 110 may be configured to communicate with the first NN 106 via a wired or wireless connection.

Different terminal devices 104, such as a user equipment—(UE—) type terminal device 104A (e.g., a smartphone) and two IoT-type terminal devices 104B, 104C (e.g., a car and a wearable device), may be serviced by the CD 102 via the AND 103 (e.g., a third network node thereof, for example an access point or a base station in the AND 103). These terminal devices are collectively denoted by reference numeral 104.

The services provided by the CD 102 may include transporting content (e.g., data traffic such as audio, video or multimedia traffic) between the CPD 110 and the terminal devices 104. The data traffic transported through the CD 102 may primarily be generated by a traffic sender (e.g., the second NN 112) in the CPD 110. It will be appreciated that any of the terminal devices 104 could likewise function as a sender of data traffic (e.g., when uploading video or audio data). In such a case the corresponding terminal device 104 will take the role of the traffic sender.

In the following, apparatus embodiments of the first NN 106 and the second NN 112 will be described with reference to FIGS. 2A and 2B, respectively. Operations of the apparatus embodiments will be described with reference to corresponding method embodiments illustrated in flow diagrams 300, 310 of FIGS. 3A and 3B, respectively.

Figure 2A:
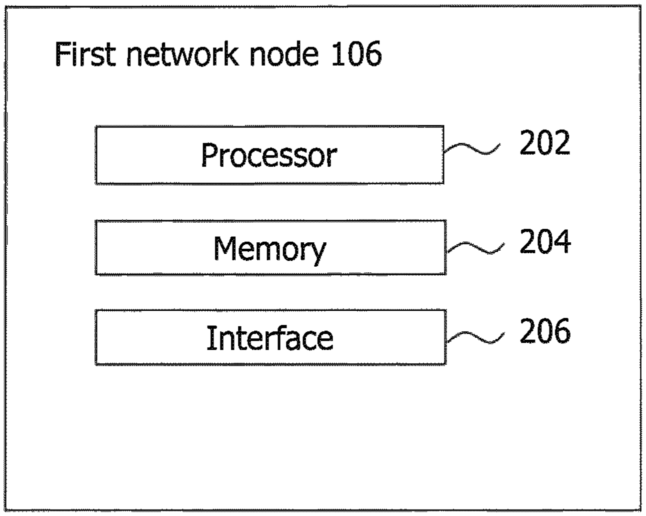
FIGS. 2A, 2B are block diagrams illustrating apparatus embodiments of a first network node and a second network node in accordance with the present disclosure.
Figure 3A:
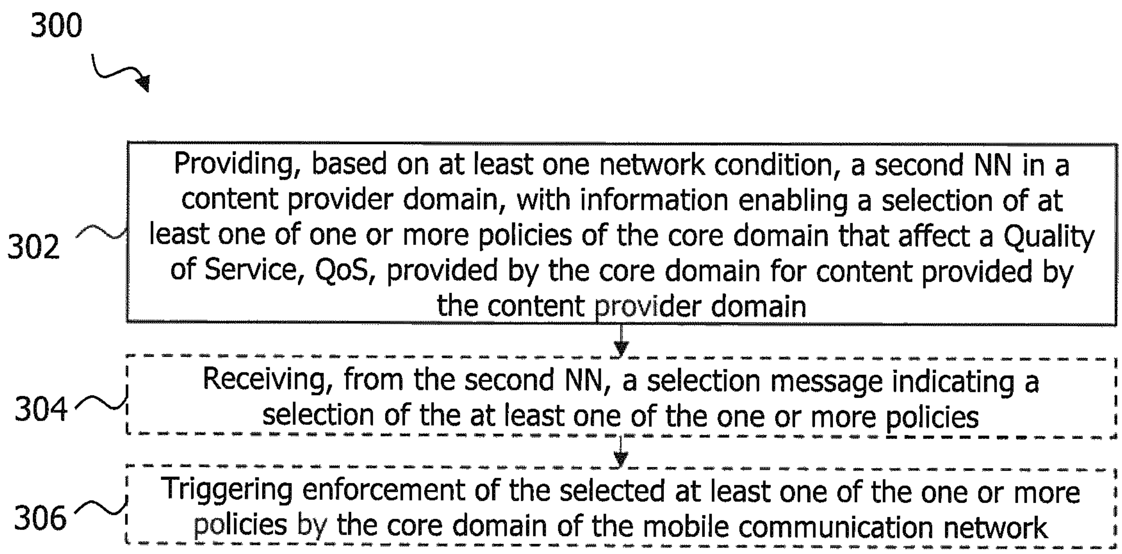
FIGS. 3A, 3B illustrate flow diagrams of two method embodiments in accordance with the present disclosure.
Figure 3B:
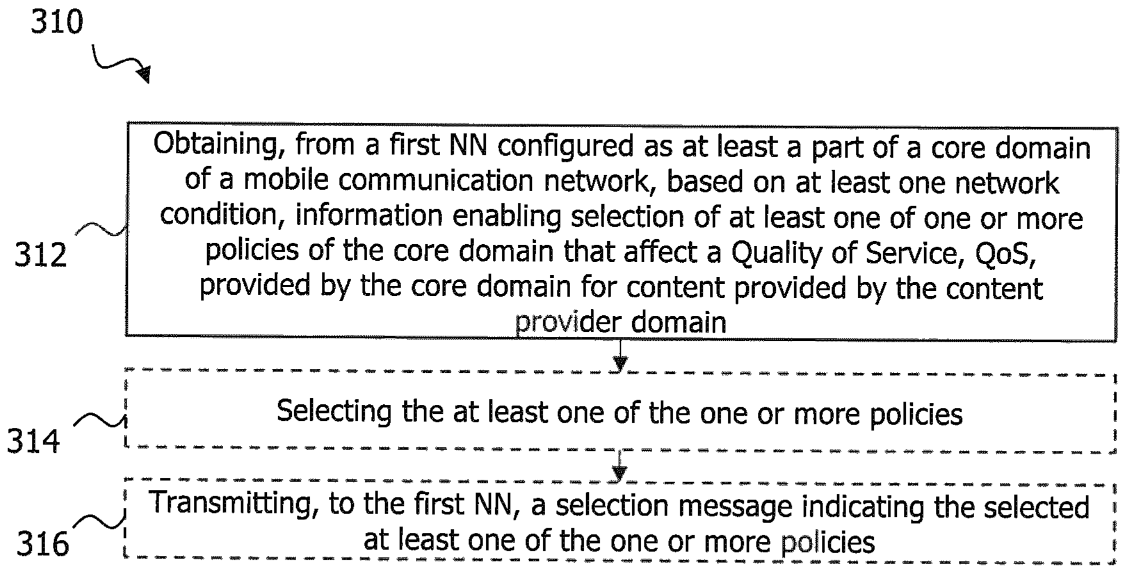

FIG. 2A illustrates an embodiment of the first NN 106 of FIG. 1. In the embodiment illustrated in FIG. 2A, the first NN 106 comprises a processor 202 and a memory 204 coupled to the processor 202. The first NN 106 further comprises an optional interface 206. The memory 204 stores program code that controls operation of the processor 202. The interface 206 may be configured to receive messages from the second NN 112, and to send messages to the second NN 112.

As understood herein, a processor, such as the processor 202, may be implemented using any processing circuitry and is not limited to, for example, a single processing core but may also have a distributed topology.

The first NN 106 is configured to perform the method 300. The processor 202 of the first NN 106 is configured to provide, based on at least one network condition, the second NN 112 in the CPD 110, with information enabling a selection of at least one of one or more policies of the CD 102 that affect QoS provided by the CD 102 for content provided by the CPD 110 (step 302).

The at least one network condition may be indicative of the QoS. The QoS may be specific for network traffic associated with both the CD 102 and the CPD 110. At least one of the following conditions may be fulfilled: (i) the QoS is specific for a flow of network traffic associated with a UE 104; (ii) the QoS is specific for a flow of network traffic associated with a user or subscriber of an application; (iii) the QoS is specific for a user or subscriber of an application; (iv) the QoS is specific for an application; (v) the QoS is specific for a traffic profile provided by the CPD 110.

The first network node 106 may be configured at least as an NEF. The second NN 112 may be configured as an AF or an AS. The information may be provided by transmitting or exposing the information via an Application Programming Interface, API (e.g., between the NEF and the AF or AS).

The information may be provided, based on the at least one network condition, in case the at least one network condition fulfils a predetermined criterion. The information may (e.g., only) be provided responsive to the at least one network condition fulfilling the predetermined criterion. The predetermined criterion may be indicative of a network condition change threshold or event. The predetermined criterion may be indicative of a network congestion.

The information may be based on the at least one network condition. The information may be indicative of the at least one network condition or determined based on the at least one network condition. The information may comprise at least one parameter chosen from: (i) an identifier of a network congestion event; (ii) a value representative of a network congestion; and (iii) an indication that a selection of the at least one of the one or more policies is allowed. The processor 202 may be configured to transmit, to the second NN 112, the at least one parameter in a first message.

The information may comprise an indication of the one or more policies of the CD 102 for selection in the CPD 110. The processor 202 may be configured to transmit, to the second NN 112, the indication of the one or more policies in a second message separate from the first message.

The indicated one or more policies may be or may have been determined (e.g., in the CD 102) based on at least one process chosen from: (i) congestion estimation or prediction; (ii) prediction of user movement; (iii) analysis of available network resources; and (iv) analysis of a possible redistribution of network resources among users. The processor 202 may be configured to determine the one or more policies.

The one or more policies may comprise at least one option chosen from: (i) a network slice configuration; (ii) a guaranteed level of a QoS; (iii) one or more traffic handling rules; (iv) a configuration of reserved resources on an edge of the mobile communication network; and (v) a transmission type.

The processor 202 may be configured to receive, from the second NN 112, a selection message indicating a selection of the at least one of the one or more policies (step 304). The processor 202 may be configured to trigger enforcement of the selected at least one of the one or more policies by the CD 102 (step 306).

Figure 2B:
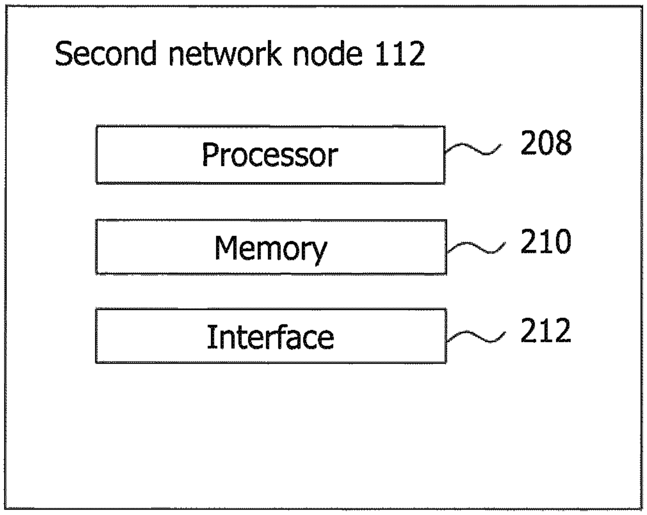

FIG. 2B illustrates an embodiment of the second NN 112 of FIG. 1. In the embodiment illustrated in FIG. 2B, the second NN 112 comprises a processor 208 and a memory 210 coupled to the processor 208. The second NN 112 further comprises an optional interface 212. The memory 210 stores program code that controls operation of the processor 208. The interface 212 may be configured to receive messages from the first NN 106, and to send messages to the first NN 106.

The second NN 112 is configured to perform the method 310. The processor 208 of the second NN 112 is configured to obtain, from the first NN 106, based on at least one network condition, information enabling selection of at least one of one or more policies of the CD 102 that affect a QoS provided by the CD 102 for content provided by the CPD 110 (step 312). The information obtained by the second NN 112 in step 312 may correspond to the information provided by the first NN 106 in step 302.

As mentioned above, the first network node 106 may be configured at least as an NEF and the second NN 112 may be configured as an AF or an AS. The processor 208 may be configured to obtain the information by receiving or discovering the information via an (e.g., the) API. The processor 208 may be configured to obtain the information, based on the at least one network condition, in case the at least one network condition fulfils a predetermined criterion. The processor 208 may be configured to obtain the information responsive to the at least one network condition fulfilling the predetermined criterion.

The processor 208 may be configured to receive, from the first NN 106, the at least one parameter in the first message, and to receive, from the first NN 106, the indication of the one or more policies in the second message separate from the first message.

The processor 208 may be configured to select the at least one of the one or more policies (step 314).

The processor 208 may be configured to select the at least one of the one or more policies that complies with a QoE. The QoE may be associated with or specific for at least one of (i) the flow of network traffic associated with the UE 104; (ii) the flow of network traffic associated with the user or subscriber of the application; (iii) the user or subscriber of the application; (iv) the application; (v) the traffic profile provided by the CPD 110.

The processor 208 may be configured to select the at least one of the one or more policies that complies with a required QoS. The required QoS may be associated with or specific for at least one of (i) the flow of network traffic associated with the UE 104; (ii) the flow of network traffic associated with the user or subscriber of the application; (iii) the user or subscriber of the application; (iv) the application; (v) the traffic profile provided by the CPD 110.

The processor 208 may be configured to determine the required QoS based on a predefined relationship between the QoE and the required QoS. The predefined relationship may be associated with or specific for at least one of (i) the flow of network traffic associated with the UE 104; (ii) the flow of network traffic associated with the user or subscriber of the application; (iii) the user or subscriber of the application; (iv) the application; (v) the traffic profile provided by the CPD 110.

The processor 208 may be configured to transmit, to the first NN, a selection message indicating the selected at least one of the one or more policies (step 316). The processor 208 may be configured to trigger enforcement of the selected at least one of the one or more policies by transmitting the selection message to the first NN 106.

The above general embodiments will now be described in greater detail with reference to certain technical specifications (TSs) defined by the 3rd Generation Partnership Project (3GPP) for 5G communication systems. 3GPP TS 23.501 V17.3.0 (2021-12) defines architectural aspects of a 5G service based architecture (SBA). According to this SBA, network functions (NF) use service-based interactions to consume services from other NFs. The discovery of services and of NFs producing them is provided by a network repository function (NRF). Service producing NFs register, update or deregister their profiles in the NRF. Service consuming NFs discover services offered by NF producer instances by querying the NRF about NF instances offering services of a given type. NFs may subscribe and unsubscribe to changes in the status of NFs registered in the NRF. Based on such subscriptions, the NRF will notify NFs of status changes of other NFs.

Figure 4:
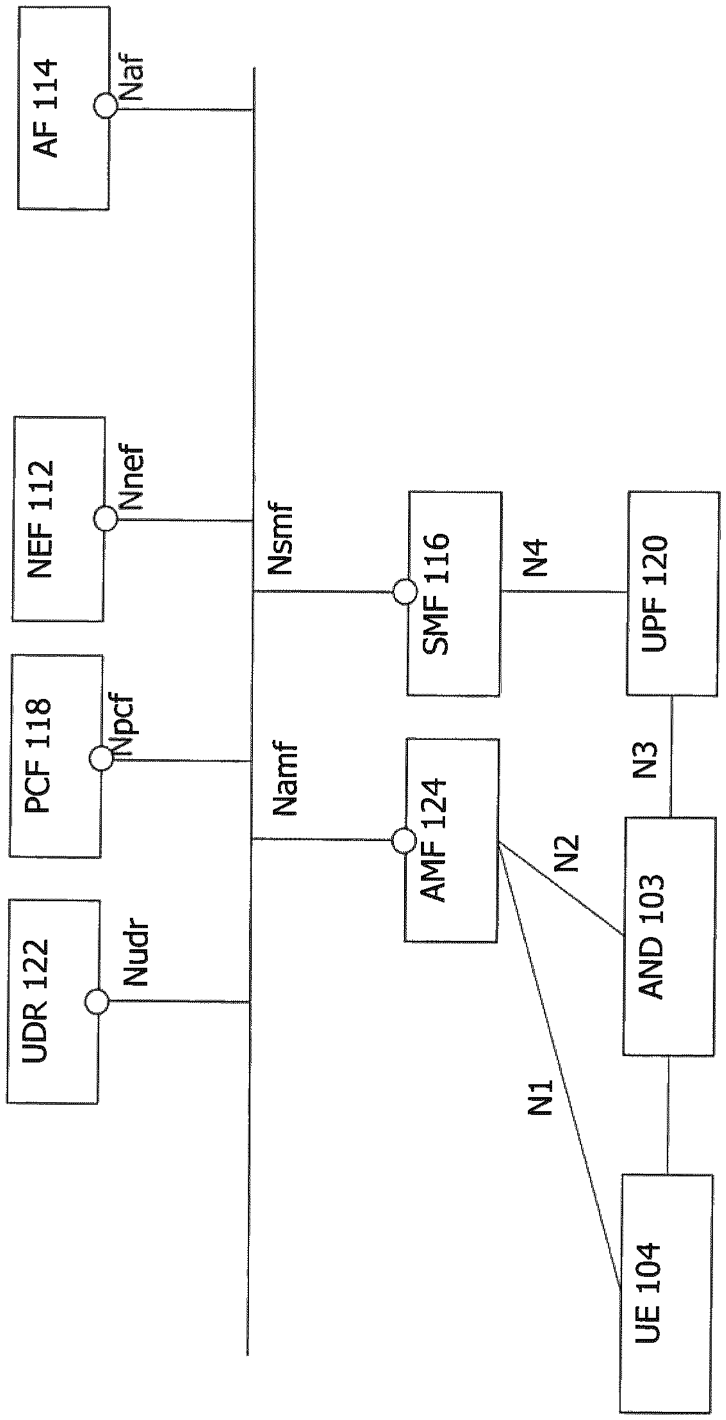
FIG. 4 is a diagram illustrating an exemplary 5G network architecture that can form the basis of embodiments of the present disclosure.

FIG. 4 depicts a portion of the 5G reference architecture as defined by 3GPP (see, e.g., Section 4.2.3 of 3GPP TS 23.501 V17.3.0). The relevant architectural core network entities (NFs) and core network interfaces for some embodiments include:

1) An UE as an exemplary terminal device 104 (see FIG. 1). The UE 104 constitutes, for example, an endpoint of a video or audio streaming session that stretches via the AND 103, such as a (radio) access network, (R)AN.
2) An NEF 112 has a Nnef interface and supports different functionality. Specifically, in the context of the embodiments, the NEF 112 acts as an entry point into the core network domain 102. The first network node 106 may be configured as the NEF 112. The AF 114 outside the core network domain 102 interacts with the core network domain 102 through the NEF 112. The NEF 112 in embodiments supports different Exposure APIs.
3) A session management function (SMF) 116 has an Nsmf interface. In the embodiments, the SMF 116 receives PCC rules from a policy control function (PCF) 118 and configures a user plane function (UPF) 120 accordingly.
4) The user plane function (UPF) 120 has an N4 interface to the SMF 116 and an N3 interface to RAN 103. The UPF 120 supports handling of user plane data traffic based on the rules received from the SMF 116. The UPF 120 may support packet inspection and different enforcement actions such as QoS handling.
5) The policy control function (PCF) 118 supports, via an Npcf interface, a unified policy framework to govern the behavior of the core domain. The PCF 108 may provide policy and charging control (PCC) rules to the PCEF (SMF 116/UPF 120) that enforces policy and charging decisions according to the PCC rules provided by the PCF 118.
6) An UDR 122 centrally stores data in the core network domain 102. The data may be stored grouped into distinct collections of subscription-related information, for example subscription data, policy data, structured date for exposure and application data.
7) An access and mobility management function (AMF) 124 handles access and mobility for the UE 104.

The AF 114 interacts with the CD 102, and in embodiments allows external parties such as a content provider to use the Exposure APIs offered via the NEF 112. The AF 114 is located in the CPD 110. The AF 114 may be located on or act as an AS of the content provider operating the CPD 110. The CD 102 may comprise additional network functions not shown in FIG. 4, as for example described in 3GPP TS 23.501 V17.3.0.

The following embodiments may be based on an extension of the NEF's 112 Nnef interface by defining a new API allowing a content provider to be provided with information enabling a selection of at least one of one or more policies of the CD 102 that affect a QoS provided by the CD 102 for content provided by the CPD 110. The embodiments may allow a negotiation between the content provider domain 110 and the core domain 102 on the one or more policies of the CD 102 that affect the QoS. Additional extensions can be made to one or more of the Npcf, Nudr, Nsmf and N4 interfaces, for example to forward at least one selected QoS policy to the UPF 120 that will use it to apply traffic handling actions (e.g., traffic optimization) for data traffic generated in an application session (e.g., on a per flow basis).

In the following description, exemplary 5G signaling embodiments will be described with reference to FIGS. 5A to 5C. Before step 1 of FIG. 5A, a protocol data unit (PDU) session may already be established. The PDU session may provide end-to-end user plane connectivity between the UE 104 and the CPD 110 through the UPF 120.

Figure 5A:
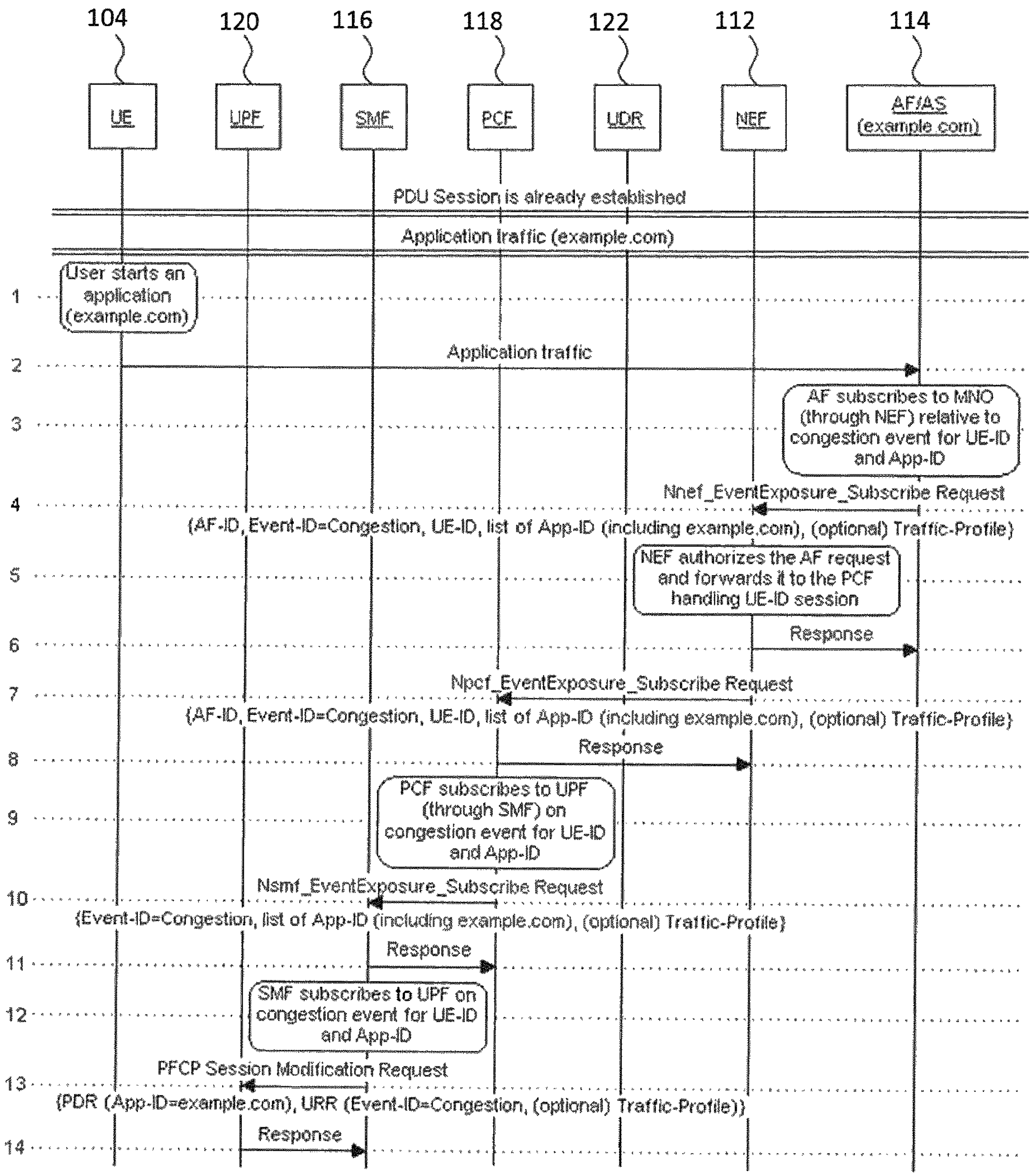
FIGS. 5A-5C are schematic signaling diagrams illustrating further embodiments of the present disclosure in the context of the 5G network architecture of FIG. 4.

In step 1 of FIG. 5A, a user may start an application on the UE 104. The user may start an application that sends traffic to the CPD 110, e.g., by sending application traffic to the AF or AS 114 (e.g., a server addressable by the uniform resource locator (URL) "example.com"), as shown in step 2. Alternatively or additionally, the started application may receive content from the AF or AS 114.

In step 3 of FIG. 5A, when the AF/AS 114 receives the application traffic, the AF/AS 114 may subscribe to (e.g., the MNO that manages) the CD 102, through the NEF 112. The AF/AS 114 may subscribe relative to at least one network condition change event (e.g., a network congestion). The AF/AS 114 may subscribe to the at least one network condition change event for at least one entity chosen from the UE 104 and the application started by the user.

The AF/AS 114 may subscribe by sending a subscription message to the NEF 112 (step 4). The subscription message may correspond to the "first request" as described herein. The subscription may be based on an extension of the existing Nnef_EventExposure API or service. The subscription message may be a Nnef_EventExposure_Subscribe Request. The subscription message may comprise at least one of the following entries:

(i) a first identifier ("AF-ID"), which identifies at least one of the content provider, the CPD 110, the AF 114 or the AS 114;
(ii) a second identifier of at least one network condition change event ("Event-ID=Congestion");
(iii) a third identifier ("UE-ID"), which identifies at least one of the UE 104, the user of the UE 104, or a subscriber of the application started on the UE 104;
(iv) a fourth identifier ("App-ID"), which identifies at least one application of interest, for example the application started on the UE 104;
(v) an indication of a traffic profile, e.g., of at least one entity chosen from the UE 104, the user, the subscriber and the application ("Traffic Profile").

In case more than one application of interest is to be indicated, the fourth identifier may comprise a list of App-IDs, wherein each App-ID identifies a different application of interest. In one example, if no fourth identifier is included in the message sent in step 4, or if the fourth identifier applies to all applications, the subscription may refer to all traffic in the current PDU or user session.

In an alternative implementation, the subscription by the AF/AS 114 may be triggered before receiving the application traffic at the AF/AS 114. The subscription by the AF/AS 114 may even be triggered before the user starts the application.

In step 5 of FIG. 5A, the NEF 112 may authorize the request received from the AF/AS 114. In case of successful authorization, the NEF 112 may send a response message to the AF/AS 114 indicating successful authorization (step 6). The NEF 112 may forward one or more of the entries (e.g., at least the indication of the at least one network condition change event) comprised in the request message received from the AF/AS 114 to the PCF 118. The NEF 112 may forward all entries comprised in the message received in step 4 to the PCF 118. The NEF 112 may forward the one or more (e.g., all) entries by sending a message to the PCF 118 in step 7. The PCF 118 to which the one or more entries are forwarded may be the PCF handling the PDU session established for the UE 104. This PCF may be identified based on at least some of the entries, for example based on the third identifier. The subscription request message may be forwarded from the NEF 112 to the PCF 118 as a Npcf_EventExposure_Subscribe Request message.

In step 8 of FIG. 5A, the PCF 118 may answer (e.g., acknowledge) the message received from the NEF 112 in step 7, to indicate successful operation.

In step 9 of FIG. 5A, the PCF 118 may subscribe to the UPF 120 through the SMF 116 relative to the at least one network condition change event. The subscription may be specific for the UE 104. The subscription may be based on the third identifier comprised in the message received from the NEF 112 in step 7. Alternatively or additionally, the subscription may be specific for the at least one application of interest. The subscription may be based on the fourth identifier comprised in the message received from the NEF 112 in step 7.

The PCF 118 may retrieve information on the at least one network condition change event from the UPF 120 via the SMF 116. This information retrieval may be implemented as now described with reference to steps 10 to 19 of FIG. 5A and FIG. 5B.

The PCF 118 may forward one or more of the entries (e.g., at least the indication of the at least one network condition change event) comprised in the message received in step 7 to the SMF 116. The PCF 118 may forward all entries (e.g., except for the first identifier) comprised in the message received in step 7 to the SMF 116. The PCF 118 may forward the one or more (e.g., all) entries by sending a message to the SMF 116 in step 10. The message sent from the PCF 118 to the SMF 116 may be a Nsmf_EventExposure_Subscribe Request message (step 10).

In step 11 of FIG. 5A, the SMF 116 may send a response or acknowledgement message to the PCF 118 to indicate successful operation.

In step 12 of FIG. 5A, the SMF 116 may subscribe to the UPF 120 relative to the at least one network condition change event (e.g., the congestion event). The subscription may be specific for the UE 104. The subscription may be based on the third identifier comprised in the message received from the PCF 118 in step 10. Alternatively or additionally, the subscription may be specific for the at least one application of interest. The subscription may be based on the fourth identifier comprised in the message received from the PCF 118 in step 10.

The subscription by the SMF 116 may be as specific as the subscription of the PCF 118 of step 9. That is, if the subscription in step 9 is specific for the UE 104, the subscription in step 12 may also be specific for the UE 104. If the subscription in step 9 is specific for a particular application, the subscription in step 12 may also be specific for the particular application.

The SMF 116 may send a message to the UPF 120 triggering a change in the configuration of the UPF 120 or a change in the rules applied by the UPF 120 (step 13). The message sent to the UPF 120 may comprise at least one of the following rules:

(i) one or more packet data rules, PDR ("PDR (App-ID=(example.com))");
(ii) one or more usage reporting rules, URR ("URR (Event-ID=Congestion, (optional) Traffic-Profile)").

At least one of the one or more packet data rules may be specific for the at least one application of interest (e.g., as identified by the fourth identifier). At least one of the one or more usage reporting rules may be associated with the at least one network change event (e.g., a network congestion). The at least one of the one or more usage reporting rules may be indicative of a reporting trigger in case of the at least one network change event (e.g., the congestion) being detected by the UPF 120. The same or another of the one or more usage reporting rules may be specific for the traffic profile (e.g., as indicated by the entry (v) mentioned above).

In step 14 of FIG. 5A, the UPF 120 may answer (e.g., acknowledge) the message received in step 13 to indicate successful operation.

Figure 5B:
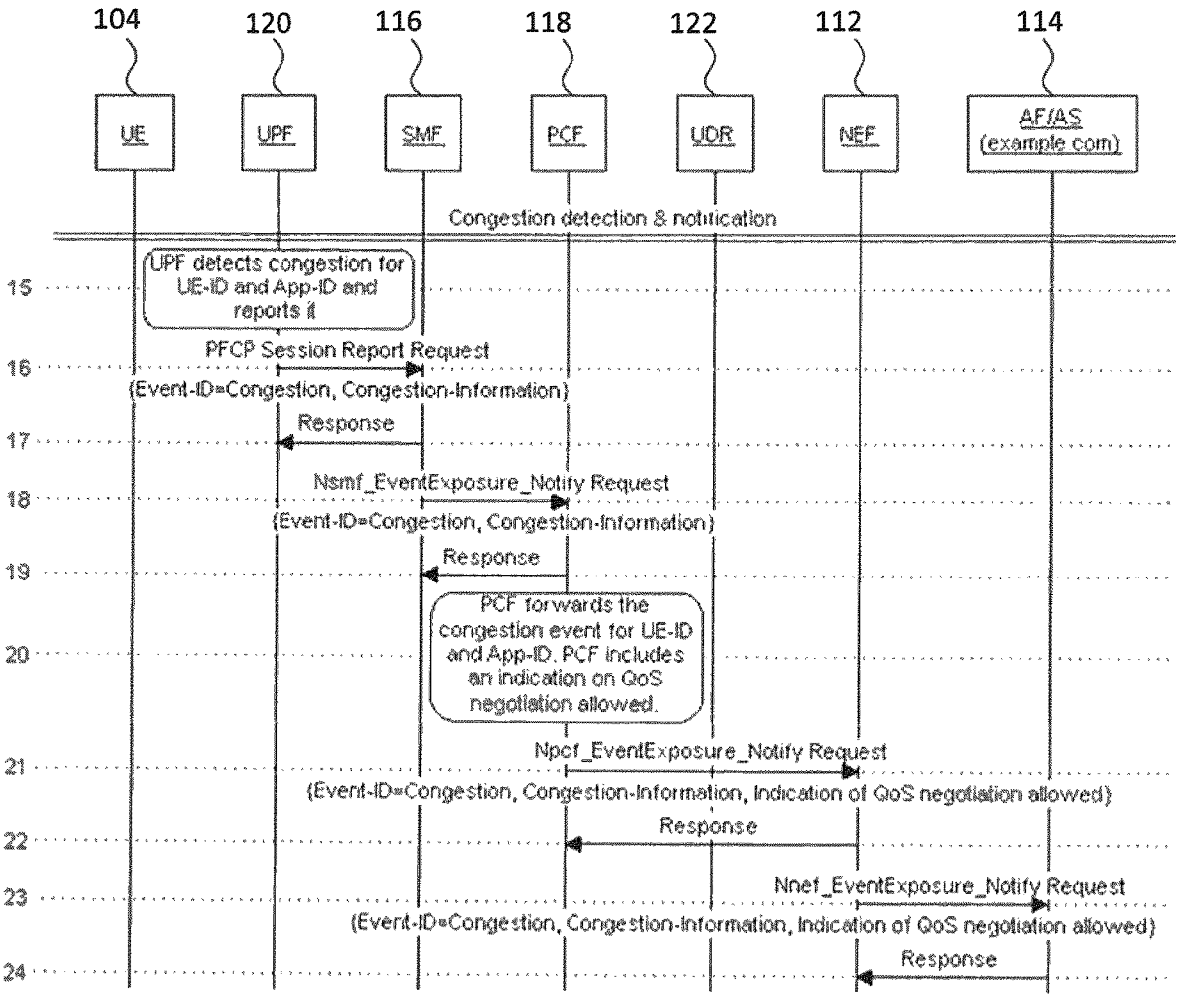

The flow diagram shown in FIG. 5B proceeds with step 15, which may follow step 14 shown in FIG. 5A. The flow diagram of FIG. 5B generally relates to the detection and notification of the at least one network condition change event (e.g., the congestion).

In the sequence of FIG. 5B, information may be transmitted from the CD 102 to the CPD 110. The information may be transmitted only if the at least one network condition fulfils a predetermined criterion, for example only if, and responsive to, a detection of the at least one network condition change event in the core domain 102.

In step 15 of FIG. 5B, the UPF 120 may detect the at least one network condition change event (e.g., the congestion). The at least one network condition change event may be detected specifically for the UE 104 (e.g., identified by the third identifier). Alternatively or additionally, the at least one network condition change event may be detected specifically for the at least one application of interest (e.g., identified by the fourth identifier).

The at least one network condition change event may be detected based on one or more key performance indicator (KPI) measurements. For example, the at least one network condition change event may be detected by measuring a transmission control protocol (TCP) round trip time (RTT) for traffic flows matching at least one PDR applied by the UPF 120. The at least one network condition change event may be detected by measuring the TCP RTT for traffic flows matching at least some (e.g., all) of the rules comprised in the message received from the SMF 116 in step 13. The congestion may be detected by measuring the TCP RTT for traffic flows matching the one or more PDRs comprised in the message received from the SMF 116 in step 13.

The UPF 120 may report the detected at least one network condition change event by sending a reporting message to the SMF 116 (step 16). The message sent from the UPF 120 to the SMF 116 may be a PFCP Session Report Request message. The message sent from the UPF 120 to the SMF 116 in step 16 may comprise at least one of the following detection results:

(i) an identifier of the detected at least one network condition change event (e.g., the second identifier);

(ii) a (e.g., measured or predicted) value representative of the detected at least one network condition change event (e.g., a value representative of the detected congestion, referred to in FIG. 5B as "Congestion-Information").

The sequence diagram in FIGS. 5A and 5B shows a scenario based on congestion detection by the UPF 120. The congestion may alternatively or additionally be predicted, for example based on analytics (e.g., of anticipated traffic flows and available network resources).

In step 17 of FIG. 5B, the SMF 116 may answer (e.g., acknowledge) the message received from the UPF 120 in step 16, to indicate successful operation.

In step 18 of FIG. 5B, the SMF 116 may send, to the PCF 118, a message comprising at least some of the detection results comprised in the message received in step 16. The message sent in step 18 may comprise all detection results of the message received in step 16. The message sent in step 18 may be a Nsmf_EventExposure_Notify Request message.

In step 19 of FIG. 5B, the PCF 118 may answer (e.g., acknowledge) the message received in step 18 to indicate successful operation.

In step 20 of FIG. 5B, the PCF 118 may determine whether a QoS negotiation is allowed, based on the detection result(s) received in step 18. The PCF 118 may determine (e.g., based on the detection result(s) received in step 18) that a selection of at least one of one or more policies of the CD 102, having an effect on the Qos provided by the CD 102 to content provided by the CPD 110, is allowed.

The PCF 118 may send a message to the NEF 112 in step 21 of FIG. 5B. The message sent in step 21 may comprise an indication that a QoS negotiation is allowed. The message sent in step 21 may comprise an indication that the selection of the at least one of the one or more policies of the CD 102, having an effect on the QoS provided by the CD 102 to content provided by the CPD 110, is allowed. Alternatively or additionally, the message sent in step 21 may comprise at least some or all of the detection results of the message received in step 18. The message sent from the PCF 118 to the NEF 112 in step 21 of FIG. 5B may comprise at least one of the following parameters:

(i) the identifier of the detected at least one network condition change event (e.g., the second identifier);

(ii) the (e.g., measured or predicted) value representative of the detected at least one network condition change event (e.g., the value representative of the detected congestion);

(iii) the indication that the QoS negotiation and/or the selection of the at least one of the one or more policies is allowed.

The message sent in step 21 may be a Npcf_EventExposure_Notify Request message.

In step 22 of FIG. 5B, the NEF 112 may answer (e.g., acknowledge) the message received in step 21 to indicate successful operation.

In step 23 of FIG. 5B, the NEF 112 may send a message to the AF/AS 114. The message sent in step 23 may correspond to the "first message" described herein. The message sent in step 23 may comprise at least one of the parameters comprised in the message received in step 21. The message sent in step 23 may comprise information that is based on the at least one network condition, for example based on the at least one network condition change event. The message sent in step 23 may comprise information indicative of the at least one network condition (e.g., the identifier of the detected at least one network condition change event). The message sent in step 23 may comprise information determined based on the at least one network condition (e.g., (a) the value representative of the detected at least one network condition change event and/or (b) the indication that the QoS negotiation and/or the selection of the at least one of the one or more policies is allowed). The message sent in step 23 may comprise all parameters comprised in the message received in step 21. The message sent in step 23 may be a Nnef_EventExposure_Notify Request message. The message sent in step 23 may enable the AF/AS 114 to start a negotiation on the one or more policies of the CD 102, with the CD 102 (e.g., via the NF 112). The message sent in step 23 may provide the AF/AS 114 with information enabling the selection of the at least one of the one or more policies of the CD 102, by including the indication that the selection is allowed (e.g., the parameter (iii) described for step 21).

In step 24 of FIG. 5B, the AF/AS 114 may answer (e.g., acknowledge) the message received in step 23 to indicate successful operation.

Figure 5C:
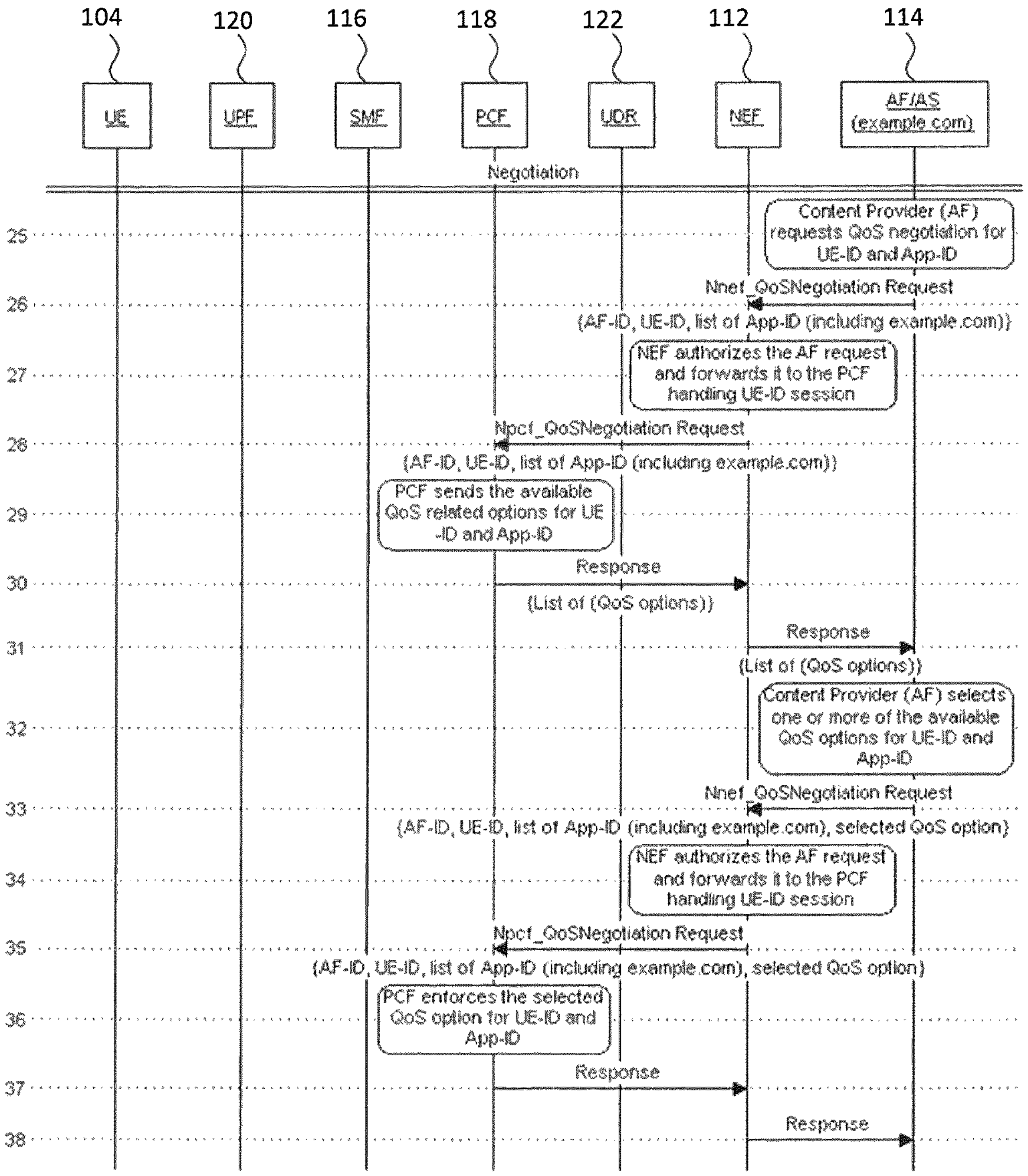

The flow diagram of FIG. 5C generally relates to the negotiation process (e.g., the selection of the at least one of the one or more policies of the CD 102). The sequence shown in FIG. 5C starts with a step 25.

The step 25 may require that the AF/AS 114 has previously been provided with the indication that the QoS negotiation and/or the selection of the at least one of the one or more policies of the CD 102 is allowed. The step 25 may follow the step 24 illustrated in FIG. 5B. In an alternative example, the step 25 may not require that the AF/AS 114 has previously been provided with the indication that the QoS negotiation and/or the selection of the at least one of the one or more policies of the CD 102 is allowed.

In step 25 of FIG. 5C, the content provider may request a QoS negotiation. The content provider may request the negotiation by sending a message from the AF/AS 114 to the NEF 112. The AF/AS 114 may be configured to determine whether to send the message to the NEF 112. The message may be a negotiation request message. The negotiation may be directed to one or more policies of the CD 102 that affect the QoS for content provided by the CPD 110. The negotiation may be directed to a selection, in the CPD 110, of at least one of the one or more policies. That is, the message may indicate that a selection, in the CPD 110, of one or more policies of the CD 102 is requested. The message may indicate that the one or more selectable policies are requested. The negotiation may be specific for the UE 104. The negotiation may be specific for the (e.g., at least one) application of interest, for example the application started on the UE 104 in step 1. In step 26, the AF/AS 114 may send the (e.g., negotiation request) message to the NEF 112. The message sent in step 26 may correspond to the "second request" described herein. The message sent in step 26 may comprise the (e.g., third) identifier of the UE 104 ("UE-ID"). The message sent in step 26 may comprise the (e.g., fourth) identifier of the at least one application of interest ("App-ID"). The message may comprise an indication that one or more selectable policies are requested or that a negotiation on the one or more policies is requested.

A new API may be used, referred to in FIG. 5C as "Nnef_QoSNegotiation". Alternatively, an existing API (e.g., Nnef_AFsessionWithQoS API) may be used. The API and/or the message sent in step 26 may include at least one of the following parameters:

(i) a (e.g., the) first identifier ("AF-ID"), which identifies at least one of the content provider, the CPD 110, the AF 114 or the AS 114;

(ii) a (e.g., the) third identifier ("UE-ID"), which identifies at least one of the UE 104, the user of the UE 104, or a subscriber of the application started on the UE 104;

(iii) a (e.g., the) fourth identifier ("App-ID"), which identifies at least one application of interest, for example the application started on the UE 104 in step 1;

(iv) an indication that one or more selectable policies are requested or that a negotiation on the one or more policies is requested.

In step 27 of FIG. 5C, the NEF 112 may authorize the request received from the AF/AS 114 in step 26. The NEF 112, in case of positive authorization, may forward one or more (e.g., all) of the parameters comprised in the message received in step 26 to the PCF 118. The NEF 112 may send a message to the PCF 118 in step 28 that comprises the one or more (e.g., all) parameters comprised in the message received in step 26. The PCF 118 to which the message is sent in step 28 may correspond to the PCF that is handling a (e.g., the PDU) session associated with at least one entity chosen from the UE 104 (e.g., identified by the third identifier) and the at least one application of interest (e.g., identified by the fourth identifier). The message sent to the PCF 118 may be a Npcf_QoSNegotiation Request message. Again, as an alternative, an existing API may be reused in step 27.

In step 29 of FIG. 5C, the PCF 118 may answer the message received in step 28. The PCF 118 may send an indication of the one or more selectable policies of the CD 102 to the NEF 112. The one or more selectable policies affect a QoS provided by the CD 102 for content provided by the CPD 110. The one or more selectable policies may thus be referred to as "QoS related options". The one or more selectable policies may be determined based on the at least one network condition. The one or more selectable policies may be specific for the UE 104 (e.g., identified by the third identifier). Alternatively or additionally, the one or more selectable policies may be specific for the at least one application of interest (e.g., identified by the fourth identifier). The indication of the one or more selectable policies may be sent as a list indicating each of the one or more selectable policies as a separate list entry. The indication of the one or more selectable policies may be sent in a message from the PCF 118 to the NEF 112 in step 30.

The one or more policies may comprise at least one option chosen from (i) a network slice configuration (e.g., optimized for video content, gaming content or mission critical content);

(ii) a guaranteed level or profile of a QoS;

(iii) one or more traffic handling rules (e.g., TCP policies, QUIC policies), for example enabling a traffic optimization;

(iv) a configuration of reserved resources on an edge of the communication network (e.g., placement of a particular movie at the edge, geo-location of premium users, geo-mobility patterns and installation near users); and (v) a transmission type (e.g., broadcast or multicast transmission, for example for a live transmission).

The one or more policies may be determined in the CD 102. The one or more policies may be determined by at least one function chosen from the PCF 118, the DMF 116 and the UPF 120. The PCF 118 may determine the one or more policies based on information received from the UPF 120 via the SMF 116. The CD 102 (e.g., the PCF 118) may determine the one or more policies based on at least one process chosen from (i) congestion estimation or prediction;

(ii) prediction of user movement;

(iii) analysis of available network resources; and (iv) analysis of a possible redistribution of network resources among users.

The one or more policies may be determined based on the available network resources (e.g., slices, rate, delay, memory capacity in edge, etc). The CD 102 (e.g., the PCF 118) may apply shaping or throttling to non-privileged users to gain more available resources. The CD 102 (e.g., the PCF 118) may apply advanced analytics and artificial intelligence or machine learning algorithms to determine a users' mobility and a congestion prediction.

In step 31 of FIG. 5C, the NEF 112 may answer the message received in step 26. In step 31, the NEF 112 may forward at least some of the information received in step 30 to the AF/AS 114. The NEF 112 may forward the indication of the one or more policies received in step 30 to the AF/AS 114. Again, the indication of the one or more selectable policies may be sent as a list. The indication of the one or more selectable policies may be sent in a message from the NEF 112 to the AF/AS 114 in step 31. The message sent in step 31 may correspond to the "second message" described herein.

In step 32 of FIG. 5C, at least one of the indicated one or more policies may be selected. The selection may be performed in the CPD 110. The selection may be performed by the AF or the AS 114. The selection may be specific for the UE 104 (e.g., identified by the third identifier). Alternatively or additionally, the selection may be specific for the at least one application of interest (e.g., identified by the fourth identifier). The AF/AS 114 may, in step 33, send a message to the NEF 112 indicating the selected at least one of the one or more policies. The message sent in step 33 may correspond to the "selection message" described herein. The message sent in step 33 may comprise, in addition to the indication of the selected at least one of the one or more policies, one or more of the following entries:

(i) a (e.g., the) first identifier ("AF-ID"), which identifies at least one of the content provider, the CPD 110, the AF 114 or the AS 114;

(ii) a (e.g., the) third identifier ("UE-ID"), which identifies at least one of the UE 104, the user of the UE 104, or a subscriber of the application started on the UE 104;

(iii) a (e.g., the) fourth identifier ("App-ID"), which identifies at least one application of interest, for example the application started on the UE 104 in step 1.

The message sent in step 33 may be a Nnef_QoSNegotiation Request message. Alternatively, an existing API may be reused in this context (e.g., as described for step 26 above).

Although not shown in the sequence diagram of FIG. 5C, the selected at least one policy may (e.g., also) be stored (e.g. in UDR 122). The indication of the one or more policies may be stored in the UDR 122. The stored data may be reused for flows with a same characteristics of a same user. This may avoid repeating the selection of the at least one of the one or more policies in case a similar network condition change event (e.g., a congestion) is detected at a later point in time.

In step 34 of FIG. 5C, the NEF 112 may authorize the request received in step 33. In case of a positive authorization, the NEF 112 may forward at least the indication of the selected at least one policy to the PCF 118. The NEF 112 may forward the indication of the selected at least one policy by sending a message to the PCF 118 in step 35. The message may comprise some or all of the additional entries comprised in the message received in step 33. The PCF 118 to which the message is sent in step 35 may correspond to the PCF that is handling a (e.g., the PDU) session associated with at least one entity chosen from the UE 104 (e.g., identified by the third identifier) and the at least one application of interest (e.g., identified by the fourth identifier).

In step 36 of FIG. 5C, the PCF 118 may enforce the selected at least one policy (also referred to as "QoS option" herein). The PCF 118 may enforce the selected at least one policy specifically for the UE 104 (e.g., identified by the third identifier). The PCF 118 may enforce the selected at least one policy specifically for the at least one application of interest (e.g., identified by the fourth identifier). For example, the PDU session associated with the UE 104 and the application started on the UE 104 in step 1 may be moved to a different network slice by the PCF 118, in accordance with the selected at least one of the one or more policies of the CD 102.

In step 37 of FIG. 5C, the PCF 118 may answer (e.g., acknowledge) the message received in step 35 to indicate successful operation.

In step 38 of FIG. 5C, the NEF 112 may answer (e.g., acknowledge) the message received in step 33 to indicate successful operation.

As an example, the CD 102 (e.g., the UPF 120) may predict (e.g., in step 15) that during prime time, there will be a congestion. The CD 102 may then notify (e.g., in step 23) the content provider accordingly (e.g., via the NEF 112). The content provider may then decide to place a streaming movie near its users to avoid the congestion. To this end, the content provider may request a list of core domain policies (e.g., in steps 25 and 26), and may be provided with the list of policies (e.g., in step 31). The placement decisions (e.g., taken in step 32) may differ from location to location (e.g., in a first region, a group of films A may be placed at the network edge, and in a second region, a different group of films B may be placed at the edge). After selection of a policy that corresponds to a suitable placement option, the selection may be communicated from the content provider to the core domain, where it may be enforced (e.g., in steps 33-36), resulting in the wanted placement of the streaming content at the edge of the network.

As will be apparent to those skilled in the art from the above, the present disclosure may provide a technique which solves the problems mentioned in the "Background" section. The technique may be based on an API Exposure (e.g., through the NEF 112) for QoS negotiation (e.g., a message exchange enabling the selection of the at least one of the one or more policies of the CD 102) based on at least one network condition (e.g., based on a network condition change event such as a network congestion). The API Exposure for QoS negotiation may be performed on a per subscriber/session basis and/or on a per application basis. The technique may allow a MNO managing the CD 102 and a content provider managing the CPD 110 to negotiate the QoS related policies depending on the at least one network condition.

The technique disclosed herein may allow a negotiation (e.g., between the CPD 110 and the CD 102) of actions to take when a change in the at least one network condition (e.g., a congestion event) is detected in the network 100. The at least one network condition may be specific per traffic profile and/or per user.

The negotiation may happen in real time and may comprise the CD 102 offering the selectable one or more policies of the CD 102 (e.g., based on available network conditions), so when the CPD 110 selects the at least one of the one or more selectable policies, the selected at least one policy may always be granted by the CD 102.

The content provider may benefit by choosing the action to take with congested traffic. Furthermore, the content provider may benefit by delegating the network monitoring and the congestion detection to the CD 102. The content provider may benefit further by mitigating the actions to take to the CD 102 (e.g., once the action has been selected by the content provider).

The operator of the CD 102 may benefit by offering useful information as a new service to the content provider. The operator may also benefit by avoiding frequent re-negotiations of complete SLAs.

Alternative and additional advantages may become apparent to those skilled in the art from what is disclosed herein.

Some of the steps described with reference to FIG. 5A to 5C may be changed or omitted. As an example, one or more of the response messages sent in steps 6, 8, 11, 14, 17, 19, 22, 24, 37 and 38 may not need to be sent. Alternatively, or in addition, the data included in a single message described herein may be sent in a plurality of separate messages instead. Additional entries and parameters may be included in the messages described herein. It will be appreciated that the present disclosure has been described with reference to exemplary embodiments that may be varied in many aspects.

The invention claimed is:

1. A method performed by a first network node, NN, configured as at least a part of a core domain of a mobile communication network, the method comprising:

receiving a subscription message from a second NN, which subscription is relative to at least one network condition change event, providing, based on at least one network condition, the second NN in a content provider domain with information enabling a selection of at least one of one or more policies of the core domain that affect a Quality of Service, QoS, provided by the core domain for content provided by the content provider domain, the information being provided, based on the at least one network condition, in case the at least one network condition fulfils a predetermined criterion, the predetermined criterion being indicative of a network condition change event.

2. The method of claim 1, wherein any one or more out of:

the at least one network condition is indicative of the QoS; and the QoS is specific for network traffic associated with both the core domain and the content provider domain.

3. The method of claim 1, wherein at least one of the following conditions is fulfilled:

(i) the QoS is specific for a flow of network traffic associated with a user equipment;

(ii) the QoS is specific for a flow of network traffic associated with a user or subscriber of an application;

(iii) the QoS is specific for a user or subscriber of an application;

(iv) the QoS is specific for an application; and (v) the QoS is specific for a traffic profile provided by the content provider domain.

4. The method of claim 1, wherein any one or more out of:

the second NN is configured as an Application Function, AF, or an Application Server, AS;

the information is provided by transmitting or exposing the information via an

Application Programming Interface, API; and the part of the core domain of the mobile communication network comprises a Network Exposure Function, NEF, or a Service Capabilities Exposure Function, SCEF.

5. The method of claim 1, wherein the information is provided responsive to the at least one network condition fulfilling the predetermined criterion.

6. The method of claim 5, wherein the predetermined criterion is indicative of a network congestion.

7. The method of claim 1, wherein the information is based on the at least one network condition.

8. The method of claim 7, wherein the information is indicative of the at least one network condition or determined based on the at least one network condition.

9. The method of claim 1, wherein the information comprises at least one parameter chosen from:

(i) an identifier of a network congestion event;

(ii) a value representative of a network congestion; and (iii) an indication that a selection of the at least one of the one or more policies is allowed.

10. The method of claim 9, comprising:

transmitting, to the second NN, the at least one parameter in a first message; and transmitting, to the second NN, the indication of the one or more policies in a second message separate from the first message.

11. The method of claim 1, wherein the information comprises an indication of the one or more policies of the core domain of the mobile communication network for selection in the content provider domain.

12. The method of claim 11, wherein the indicated one or more policies have been determined based on at least one process chosen from:

(i) congestion estimation or prediction;

(ii) prediction of user movement;

(iii) analysis of available network resources; and (iv) analysis of a possible redistribution of network resources among users.

13. The method of claim 11, wherein the one or more policies comprise at least one option chosen from:

(i) a network slice configuration;

(ii) a guaranteed level of a QoS;

(iii) one or more traffic handling rules;

(iv) a configuration of reserved resources on an edge of the mobile communication network; and (v) a transmission type.

14. The method of claim 11, comprising:

receiving, from the second NN, a selection message indicating a selection of the at least one of the one or more policies.

15. The method of claim 14, comprising:

triggering enforcement of the selected at least one of the one or more policies by the core domain of the mobile communication network.

16. A method performed by a second network node, NN, in a content provider domain, the method comprising:

sending a subscription message to a first NN, which subscription is relative to at least one network condition change event; and obtaining, from the first NN configured as at least a part of a core domain of a mobile communication network, based on at least one network condition, information enabling selection of at least one of one or more policies of the core domain that affect a Quality of Service, QoS, provided by the core domain for content provided by the content provider domain, the information being obtained, based on the at least one network condition, in case the at least one network condition fulfils a predetermined criterion, the predetermined criterion being indicative of a network condition change event.

17. A first network node, NN, configured as at least a part of a core domain of a mobile communication network, the first NN configured to:

receive a subscription message from a second NN, which subscription is relative to at least one network condition change event; and provide, based on at least one network condition, a second NN in a content provider domain, with information enabling a selection of at least one of one or more policies of the core domain that affect a Quality of Service, QoS, provided by the core domain for content provided by the content provider domain, the information being provided, based on the at least one network condition, in case the at least one network condition fulfils a predetermined criterion, the predetermined criterion being indicative of a network condition change event.

18. The first NN of claim 17, wherein any one or more out of:

the at least one network condition is indicative of the QoS; and the QoS is specific for network traffic associated with both the core domain and the content provider domain.

19. A second network node, NN, in a content provider domain, the second NN configured to:

send a subscription message to a first NN, which subscription is relative to at least one network condition change event; and obtain, from a first NN configured as at least a part of a core domain of a mobile communication network, based on at least one network condition, information enabling selection of at least one of one or more policies of the core domain that affect a Quality of Service, QoS, provided by the core domain for content provided by the content provider domain, the information being obtained, based on the at least one network condition, in case the at least one network condition fulfils a predetermined criterion, the predetermined criterion being indicative of a network condition change event.

20. The second NN of claim 19, wherein the information comprises at least one parameter chosen from:

(i) an identifier of a network congestion event;

(ii) a value representative of a network congestion; and (iii) an indication that a selection of the at least one of the one or more policies is allowed.

* * * * *